United States Patent
Aoyagi (10) Patent No.: US 9,477,900 B2
(45) Date of Patent: Oct. 25, 2016

(54) MEDICAL IMAGE PROCESSING APPARATUS AND MEDICAL IMAGE PROCESSING METHOD

(71) Applicant: Toshiba Medical Systems Corporation, Otawara-shi (JP)

(72) Inventor: Kota Aoyagi, Nasushiobara (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 14/621,727

(22) Filed: Feb. 13, 2015

(65) Prior Publication Data

US 2015/0235361 A1 Aug. 20, 2015

(30) Foreign Application Priority Data

Feb. 18, 2014 (JP) ................................. 2014-028720

(51) Int. Cl.
| | | |
|---|---|---|
| *G06K 9/00* | (2006.01) | |
| *G06K 9/46* | (2006.01) | |
| *G06T 19/00* | (2011.01) | |

(52) U.S. Cl.
CPC .............. *G06K 9/46* (2013.01); *G06K 9/00214* (2013.01); *G06T 19/00* (2013.01); *G06K 2209/051* (2013.01); *G06T 2210/41* (2013.01); *G06T 2219/008* (2013.01)

(58) Field of Classification Search
None
See application file for complete search history.

(56) References Cited

U.S. PATENT DOCUMENTS

| | | | | |
|---|---|---|---|---|
| 2009/0097778 A1* | 4/2009 | Washburn | ............. | G06T 7/0028 382/294 |
| 2010/0249589 A1* | 9/2010 | Lysyansky | ............. | A61B 8/466 600/440 |
| 2012/0188240 A1* | 7/2012 | Hirano | .................... | G06T 15/08 345/419 |
| 2012/0263368 A1* | 10/2012 | Nakano | .................. | A61B 6/032 382/133 |
| 2015/0035829 A1* | 2/2015 | Miyamoto | ............. | A61B 5/055 345/423 |

FOREIGN PATENT DOCUMENTS

| | | |
|---|---|---|
| JP | 2009 28515 | 2/2009 |
| JP | 2012 81254 | 4/2012 |

* cited by examiner

*Primary Examiner* — Bhavesh Mehta
*Assistant Examiner* — Oneal R Mistry
(74) *Attorney, Agent, or Firm* — Oblon, McClelland, Maier & Neustadt, L.L.P.

(57) ABSTRACT

According to one embodiment, a medical image processing apparatus includes an acquisition unit, an analysis unit, and a display controller. The acquisition unit acquires volume data of a morphological image and volume data of a functional image which are obtained by imaging an object. The analysis unit analyzes the volume data of the morphological image. The display controller controls to display a reference point on volume data of the morphological image and to decide a slice of the volume data of the functional image which passes through the reference point, based on an analysis result obtained by the analysis unit.

10 Claims, 10 Drawing Sheets

MEDICAL IMAGE PROCESSING APPARATUS AND MEDICAL IMAGE PROCESSING METHOD

CROSS-REFERENCE TO RELATED APPLICATIONS

This application is based upon and claims the benefit of priority from the prior Japanese Patent Application No. 2014-028720, filed Feb. 18, 2014, the entire contents of which are incorporated herein by reference.

FIELD

Embodiments described herein relate generally to a medical image processing apparatus and a medical image processing method which process various types of medical image data obtained by diagnosing an object and display the resultant data.

BACKGROUND

Conventionally, there has been known a technique of performing a high-accuracy diagnosis of an object by combining images of the object obtained by various types of diagnostic schemes. It is known, in particular, that combining a structure such as a bone or organ obtained from computed tomography (CT) with functional information obtained from magnetic resonance imaging (MRI) can provide high utility for, for example, surgical operation support.

As a technique of this type, there is available a fusion technique of complementarily presenting information by superimposing and displaying a plurality of images. For example, there is generally known a display method of fusing a morphological image of the coronary artery obtained from coronary arteriography CT with a functional image of myocardial perfusion obtained from positron emission tomography (PET). When a morphological image of the coronary artery is fused with a functional image of myocardial perfusion, a display method using volume rendering is generally used.

The above fusion display makes it easy to understand the relationship between a morphological defect (for example, coronary stenosis) and a functional defect (for example, myocardial ischemia).

The above fusion display based on volume rendering provides good visibility when it comes to overview. However, this technique makes it difficult to grasp the positional relationship between morphological information and functional information when paying attention to a specific region (for example, a coronary stenosis site), or requires a cumbersome operation for volume rotation or the like. In an actual diagnosis, MPR display is more common than volume rendering when performing detailed observation.

DETAILED DESCRIPTION

In general, according to one embodiment, a medical image processing apparatus includes an acquisition unit, an analysis unit, and a display controller. The acquisition unit acquires volume data of a morphological image and volume data of a functional image which are obtained by imaging an object. The analysis unit analyzes the volume data of the morphological image. The display controller controls to display a reference point on volume data of the morphological image and to decide a slice of the volume data of the functional image which passes through the reference point, based on an analysis result obtained by the analysis unit.

A medical image diagnostic system according to each embodiment will be described below with reference to the accompanying drawing. Note that the same reference numerals in the following description denote constituent elements having almost the same functions and arrangements, and a repetitive description will be made only when required.

(First Embodiment)

Figure 1:
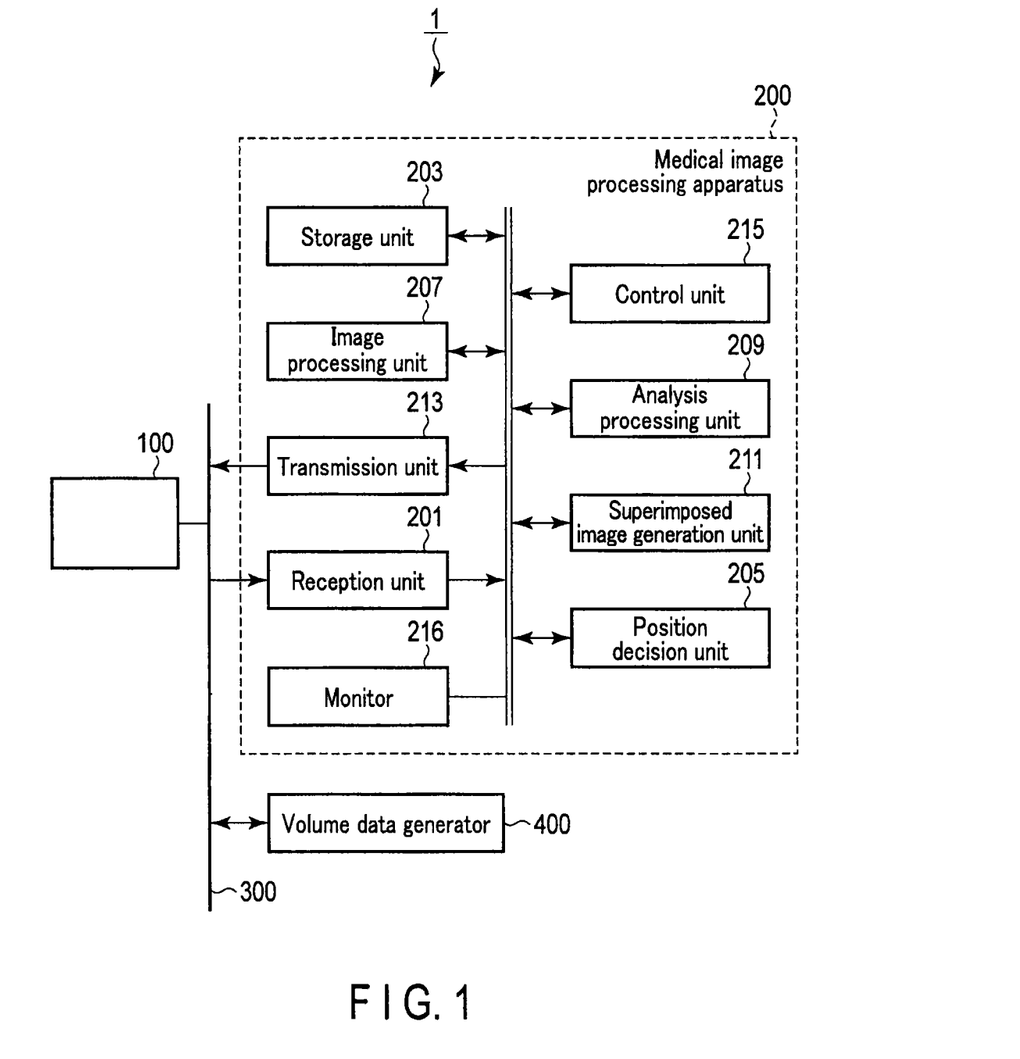
FIG. 1 is a block diagram showing an example of the arrangement of a medical image diagnostic system 1 according to the first embodiment.

FIG. 1 is a block diagram showing an example of the arrangement of a medical image diagnostic system 1 according to the first embodiment. The medical image diagnostic system 1 includes a medical image diagnostic apparatus 100 and a medical image processing apparatus 200. The medical image diagnostic apparatus 100 is electrically connected to the medical image processing apparatus 200 via a network 300. Note that they may be connected wirelessly instead of using the network 300.

Note that a volume data generator 400 may be connected to the network. The volume data generator 400 generates volume data of a morphological image by scanning an object (imaging an object). The volume data generator 400 is, for example, an X-ray CT (Computed Tomography) apparatus, an magnetic resonance imaging (MRI) apparatus, or a nuclear medicine diagnostic apparatus. The volume data generator 400 transfers volume data to the medical image processing apparatus 200 via the network 300 in accordance with an instruction from the medical image processing apparatus 200 (to be described later). In this case, for the sake of a concrete description, volume data is handled as coronary artery volume data obtained from a coronary arteriography CT.

On the other hand, the medical image diagnostic apparatus 100 is, for example, a single photon emission computed tomography (SPECT) apparatus or ultrasonic diagnostic apparatus which can display a tomographic image or projection image of an object in real time. In this case, for the sake of a concrete description, the medical image diagnostic apparatus 100 will be described as a SPECT apparatus. The medical image diagnostic apparatus 100 transmits the obtained data of a functional image of myocardial perfusion (to be referred to as SPECT data hereinafter) to the medical image processing apparatus 200 via the network 300 in accordance with an instruction from the medical image processing apparatus 200 (to be described later). Assume that SPECT data differs in diagnostic mode concerning an object from the volume data generated by the volume data generator 400.

The medical image processing apparatus 200 includes a reception unit 201, a storage unit 203, a position decision unit 205, an image processing unit 207, an analysis processing unit 209, a superimposed image generation unit 211, a transmission unit 213, and a control unit 215. Note that the medical image processing apparatus 200 may include a monitor 216 which displays the two-dimensional image processed by the image processing unit 207. In addition, the medical image processing apparatus 200 may include an input device which inputs various types of instructions concerning conditions for image processing, conditions for registration, and the like. The input device outputs various types of input instructions to the control unit 215 (to be described later).

The reception unit 201 receives the volume data generated by the volume data generator 400 via the network 300. The reception unit 201 outputs the received volume data to the storage unit 203. The reception unit 201 receives the SPECT data transmitted from the medical image diagnostic apparatus 100 via the network 300. The reception unit 201 outputs the received SPECT data to the position decision unit 205. The reception unit 201 receives various types of conditions such as an enlargement/reduction instruction, WL, WW, and image size transmitted from the medical image diagnostic apparatus 100 via the network 300. The reception unit 201 outputs various types of received conditions to the image processing unit 207.

The storage unit 203 stores the volume data received from the reception unit 201. The storage unit 203 stores image processing programs concerning predetermined image processing executed by the image processing unit 207 (to be described later). Predetermined image processing is, for example, rendering processing such as volume rendering or surface rendering or multi planar reconstruction (MPR) processing for generating an MPR image.

The storage unit 203 stores, for example, a program concerning position decision processing in the position decision unit 205 (to be described later). Position decision processing is, for example, a program concerning registration processing. The storage unit 203 stores the two-dimensional image and superimposed image generated by the image processing unit 207.

The position decision unit 205 decides a slice position in the SPECT data transmitted from the medical image diagnostic apparatus 100 with reference to volume data stored in the storage unit 203, i.e., a point on the coronary artery volume obtained from the coronary arteriography CT. The position decision unit 205 outputs the decided slice position to the image processing unit 207 (to be described later).

The image processing unit 207 executes predetermined image processing for volume data. Predetermined image processing is, for example, processing for generating an MPR image. More specifically, the image processing unit 207 generates a tomographic image (MPR image) based on a decided slice position and volume data. Tomographic images (MPR images) will be collectively called two-dimensional images hereinafter. The image processing unit 207 outputs the generated two-dimensional image to the transmission unit 213 and the superimposed image generation unit 211. Note that the two-dimensional image may be displayed on a monitor (not shown).

Note that the image processing unit 207 may execute image processing in accordance with various types of conditions output from the reception unit 201 under the control of the control unit 215 (to be described later). In addition, the image processing unit 207 generates a two-dimensional image (to be referred to as a size-changed two-dimensional image hereinafter) by changing the size of a two-dimensional image in accordance with an enlargement/reduction instruction, an image size, and the like. The image processing unit 207 outputs the size-changed two-dimensional image to the transmission unit 213. In addition, the image processing unit 207 executes rendering processing to generate a two-dimensional image as an analysis result (to be referred to as an analysis image hereinafter) by using volume data, an analysis result (to be described later), and a line-of-sight direction, or the like. The analysis image is a two-dimensional image as an analysis result of a predetermined region such as a heart region, coronary artery region, or the like.

The analysis processing unit 209 executes a predetermined analysis process based on volume data and various types of information, such as imaging conditions and a threshold. Predetermined analysis processing includes, for example, a coronary artery analysis (coronary artery evaluation and plaque property evaluation), large intestine region segmentation, calcification score, heart function analysis, cardiac electrophysiological planning, cerebral blood flow analysis, liver region segmentation, and blood vessel segmentation from aorta to iliac artery.

For the sake of simplicity, assume that predetermined analysis processing is segmentation. More specifically, the analysis processing unit 209 extracts a predetermined region from volume data by segmentation. The predetermined region is a region anatomically associated with a rendering target in volume data. If the rendering target is a region associated with the heart of the object, the predetermined region is, for example, a region associated with the coronary artery. That is, if a segmentation processing target is the coronary artery, the analysis processing unit 209 extracts a coronary artery region from the volume data. The analysis processing unit 209 outputs the extracted coronary artery region (analysis result) to the superimposed image generation unit 211 (to be described later). Note that a predetermined region is not limited to a coronary artery region, and may be an anatomical region input via the medical image diagnostic apparatus 100 or an input device (not shown).

The superimposed image generation unit 211 generates a superimposed image by superimposing an analysis image (or analysis result) on a two-dimensional image. More specifically, the superimposed image generation unit 211 generates a superimposed image by superimposing an analysis image (or analysis result) on an MPR image. For example, the superimposed image generation unit 211 generates a superimposed image by superimposing a coronary artery region on a rendering image associated with a heart region. The superimposed image generation unit 211 outputs the generated superimposed image to the transmission unit 213.

The transmission unit 213 transmits the two-dimensional image output from the image processing unit 207 to the medical image diagnostic apparatus 100. The transmission unit 213 transmits the superimposed image output from the superimposed image generation unit 211 to the medical image diagnostic apparatus 100.

The control unit 215 includes a central processing unit (CPU) and a memory (neither of which is shown). The control unit 215 controls the position decision unit 205 so as to execute registration between the SPECT data and the volume data which are transmitted from the medical image diagnostic apparatus 100. The control unit 215 controls the image processing unit 207 so as to change the size of a two-dimensional image in accordance with the enlargement/reduction instruction, WL, WW, image size, and the like transmitted from the medical image diagnostic apparatus 100. The control unit 215 controls the image processing unit 207 so as to execute image processing in accordance with various types of conditions input by the input unit or input device of the medical image diagnostic apparatus 100. The control unit 215 controls the analysis processing unit 209 to extract the anatomical region input via the medical image diagnostic apparatus 100.

The operation of the above arrangement will be described next.

Figure 2:
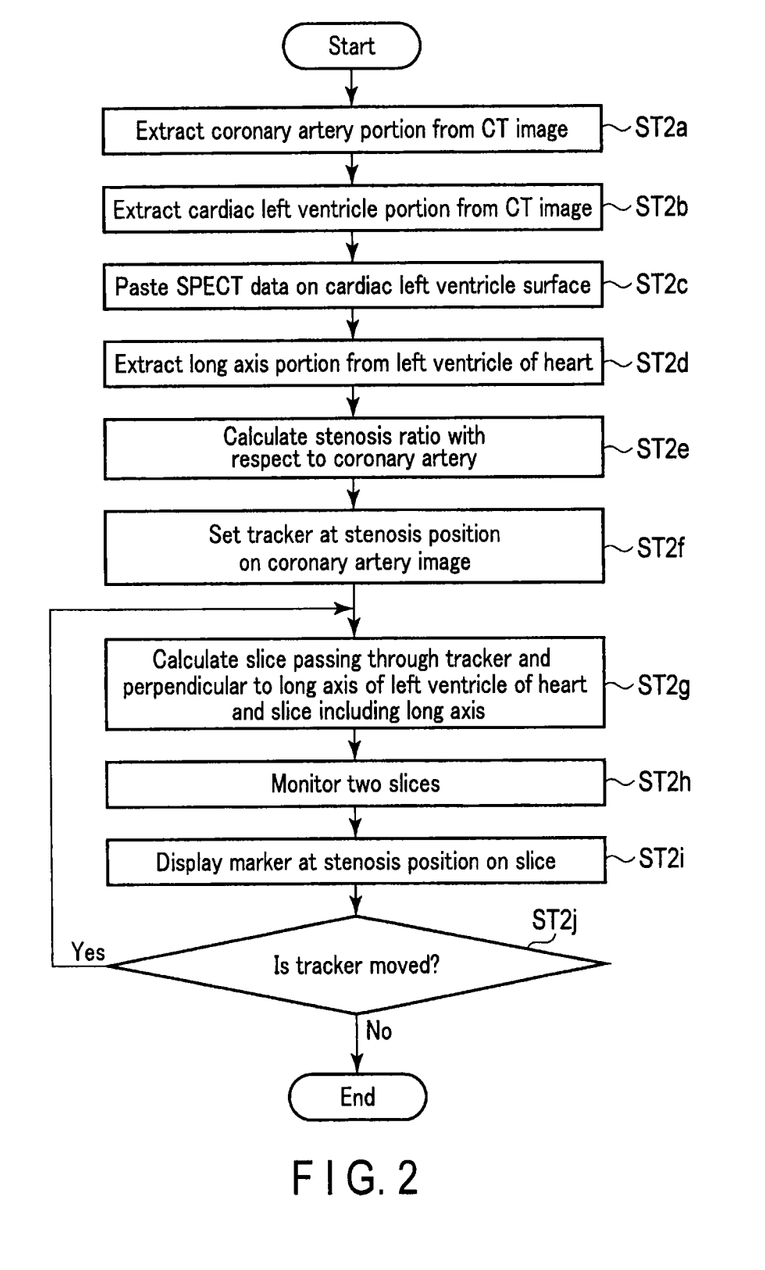
FIG. 2 is a flowchart showing a processing procedure in a medical image processing apparatus according to the first embodiment.

FIG. 2 is a flowchart showing a processing procedure in the medical image processing apparatus 200.

First of all, the medical image processing apparatus 200 extracts a coronary artery portion from a CT image (step ST2a), and extracts a cardiac left ventricle portion from the CT image (step ST2b).

Subsequently, the medical image processing apparatus 200 pastes SPECT data on the cardiac left ventricle surface extracted from the CT image (step ST2c), extracts a long axis portion from the cardiac left ventricle portion extracted from the CT image (step ST2d), and calculates a stenosis ratio with respect to the coronary artery portion extracted from the CT image (step ST2e). The medical image processing apparatus 200 then specifies a stenosis position on the coronary artery image from this stenosis ratio calculation result and sets a tracker (step ST2f).

Figure 3:
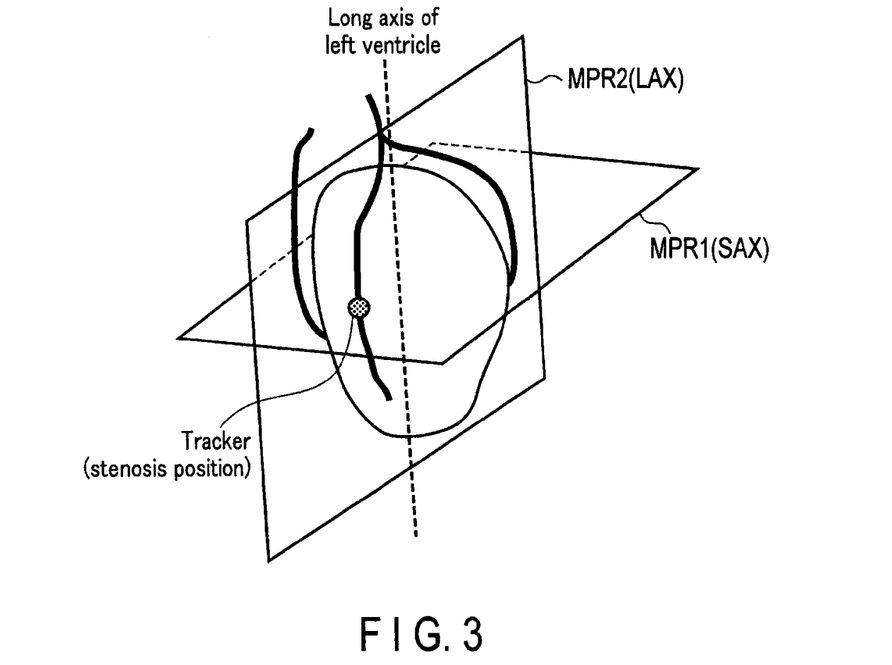
FIG. 3 is a view showing an MPR image passing through a tracker and including the long axis of the cardiac left ventricle portion extracted from a CT image and an MPR image perpendicular to the long axis of the cardiac left ventricle according to the first embodiment.

As shown in FIG. 3, the medical image processing apparatus 200 then obtains a slice (MPR1 (short axis slice)) passing through the tracker at the specified stenosis position and perpendicular to the long axis of the cardiac left ventricle and a slice (MPR2 (long axis slice)) including the long axis (step ST2g).

Figure 4:
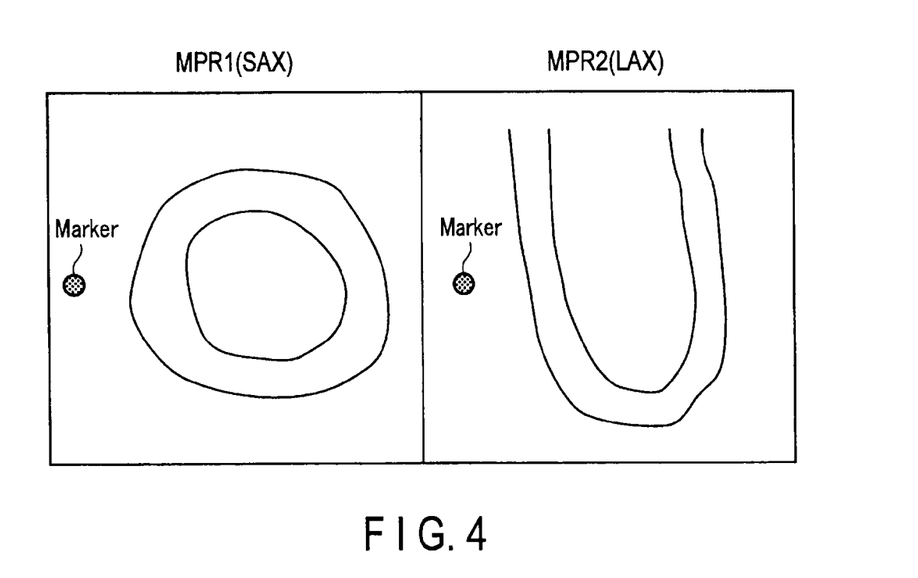
FIG. 4 is a view showing an example of displaying an MPR image including the long axis of the cardiac left ventricle and an MPR image perpendicular to the long axis of the cardiac left ventricle according to the first embodiment.

As shown in FIG. 4, the medical image processing apparatus 200 simultaneously displays, on the monitor 216, the slice (MPR1 (short axis slice)) perpendicular to the long axis of the cardiac left ventricle and the slice (MPR2 (long axis slice)) including the long axis, which are obtained in step ST2g, (step ST2h), and displays a marker (indicated by the bullet in FIG. 4) at a position corresponding to the stenosis position on each slice (step ST2i). Therefore, this display enables the user to observe the slice (MPR1 (short axis slice)) perpendicular to the long axis of the cardiac left ventricle along the coronary artery and the slice (MPR2 (long axis slice)) including the long axis.

Figure 5:
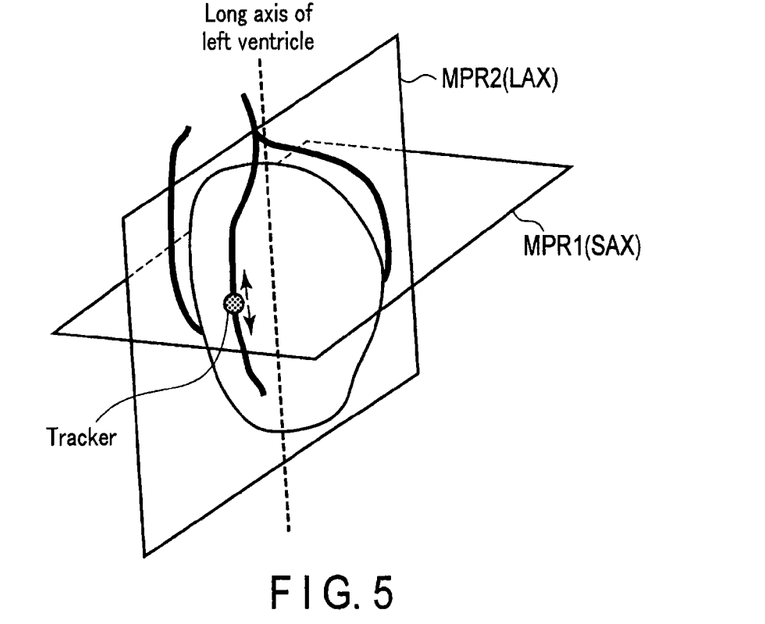
FIG. 5 is a view showing an example of obtaining an MPR image including the long axis of the cardiac left ventricle and an MPR image perpendicular to the long axis of the cardiac left ventricle when moving a tracker according to the first embodiment.

Assume that in this state, as shown in FIG. 5, the user has operated the mouse or keyboard (not shown) so as to move the tracker on the same coronary artery branch. In this case, the process shifts from step ST2j to step ST2g, and the medical image processing apparatus 200 obtains a slice (MPR1 (short axis slice)) passing through the moved tracker and perpendicular to the long axis of the cardiac left ventricle and a slice (MPR2 (long axis slice)) including the long axis, and simultaneously displays, on the monitor 216, the obtained slice (MPR1 (short axis slice)) perpendicular to the long axis of the cardiac left ventricle and the obtained slice (MPR2 (long axis slice)) including the long axis. As shown in FIG. 5, the tracker can move along the centerline of the coronary artery.

As described above, according to the first embodiment, since an MPR image is decided in SPECT data serving as a functional image with reference to a point on the coronary artery portion extracted from a CT image as a morphological image, the correspondence relationship between the morphological image and the functional image is clarified, and the MPR image enables more detailed observation.

In addition, according to the first embodiment, since a tracker which specifies a stenosis position on a coronary artery image can be moved along the centerline of the coronary artery, it is possible to observe the entire MPR image at an arbitrary position along the coronary artery.

(Second Embodiment)

In the first embodiment, an MPR image along the running of the coronary artery is observed by moving a tracker along the coronary artery.

The second embodiment has an object to arbitrarily observe an MPR image near a tracker without moving it along the running of the coronary artery.

Figure 6:
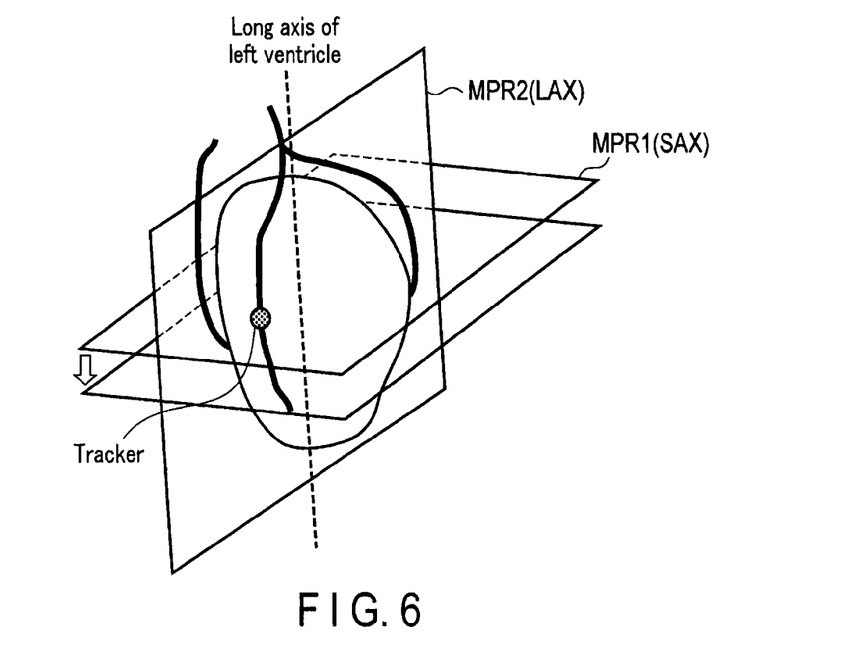
FIG. 6 is a view showing an example of translating an MPR image perpendicular to the long axis of the cardiac left ventricle according to the second embodiment.

More specifically, as shown in FIG. 6, MPR1 perpendicular to the long axis of the left ventricle can be translated in the direction of the long axis of the left ventricle. This makes it possible to place a tracker at a stenosis site and recognize MPR1 near the site.

Figure 7:
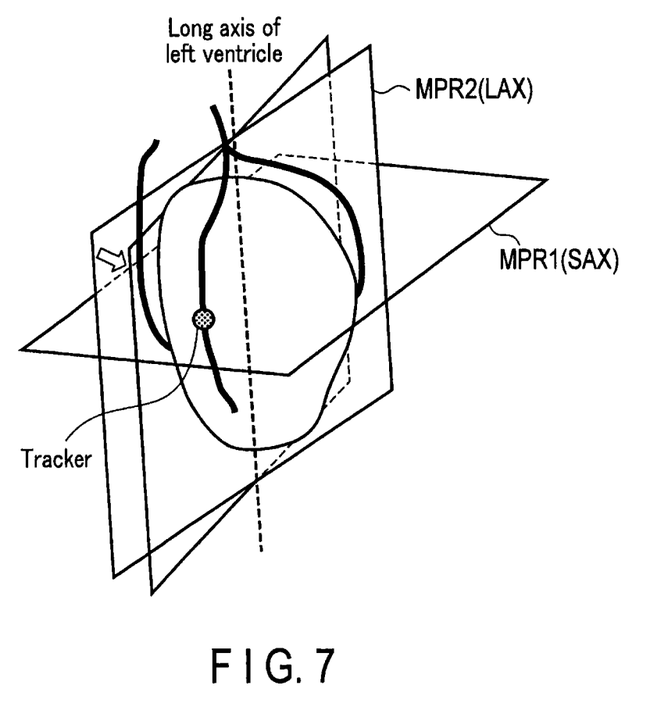
FIG. 7 is a view showing an example of rotating an MPR image including the long axis of the cardiac left ventricle according to the second embodiment.

In addition, as shown in FIG. 7, MPR2 including the long axis of the left ventricle can be rotated about the long axis of the left ventricle as a rotation axis. This makes it possible to place a tracker at a stenosis site and recognize MPR2 near the site.

A medical image processing apparatus 200 according to the second embodiment extracts a coronary artery portion from a CT image, and extracts a cardiac left ventricle portion from the CT image.

Subsequently, the medical image processing apparatus 200 pastes SPECT data on the cardiac left ventricle surface extracted from the CT image, extracts the long axis portion from the cardiac left ventricle portion extracted from the CT image, and calculates a stenosis ratio with respect to the coronary artery portion extracted from the CT image. The medical image processing apparatus 200 then specifies a stenosis position on the coronary artery image from this stenosis ratio calculation result and sets a tracker.

The medical image processing apparatus 200 then obtains a slice (MPR1 (short axis slice)) passing through the tracker at the specified stenosis position and perpendicular to the long axis of the cardiac left ventricle and a slice (MPR2 (long axis slice)) including the long axis.

Figure 8:
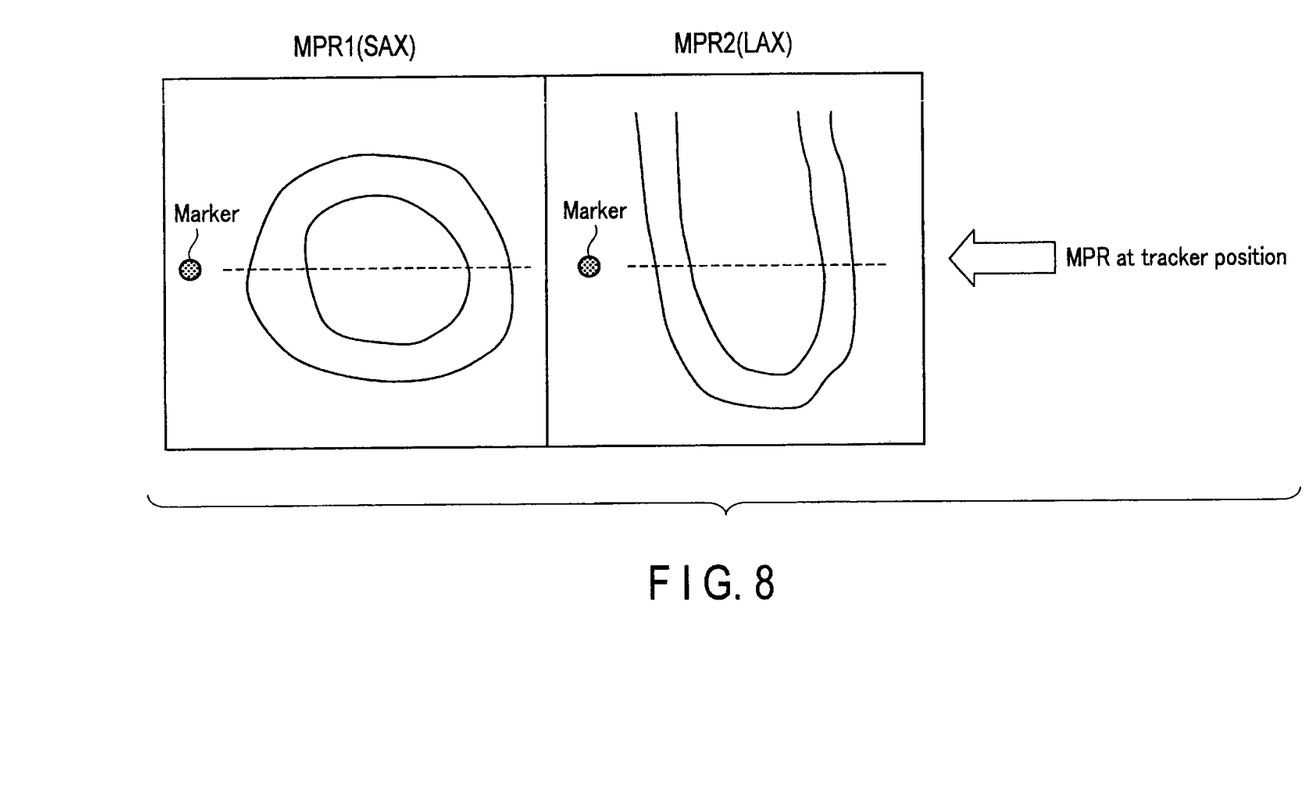
FIG. 8 is a view showing an example of displaying an MPR image including the long axis of the cardiac left ventricle and an MPR image perpendicular to the long axis of the cardiac left ventricle according to the second embodiment.

As shown in FIG. 8, the medical image processing apparatus 200 displays, on a monitor 216, the obtained slice (MPR1 (short axis slice)) perpendicular to the long axis of the cardiac left ventricle and the obtained slice (MPR2 (long axis slice)) including the long axis and a marker (indicated by the bullet in FIG. 8) at a position corresponding to the stenosis position on each slice. Therefore, this display allows the user to observe the slice (MPR1 (short axis slice)) perpendicular to the long axis of the cardiac left ventricle along the coronary artery and the slice (MPR2 (long axis slice)) including the long axis.

Figure 9:
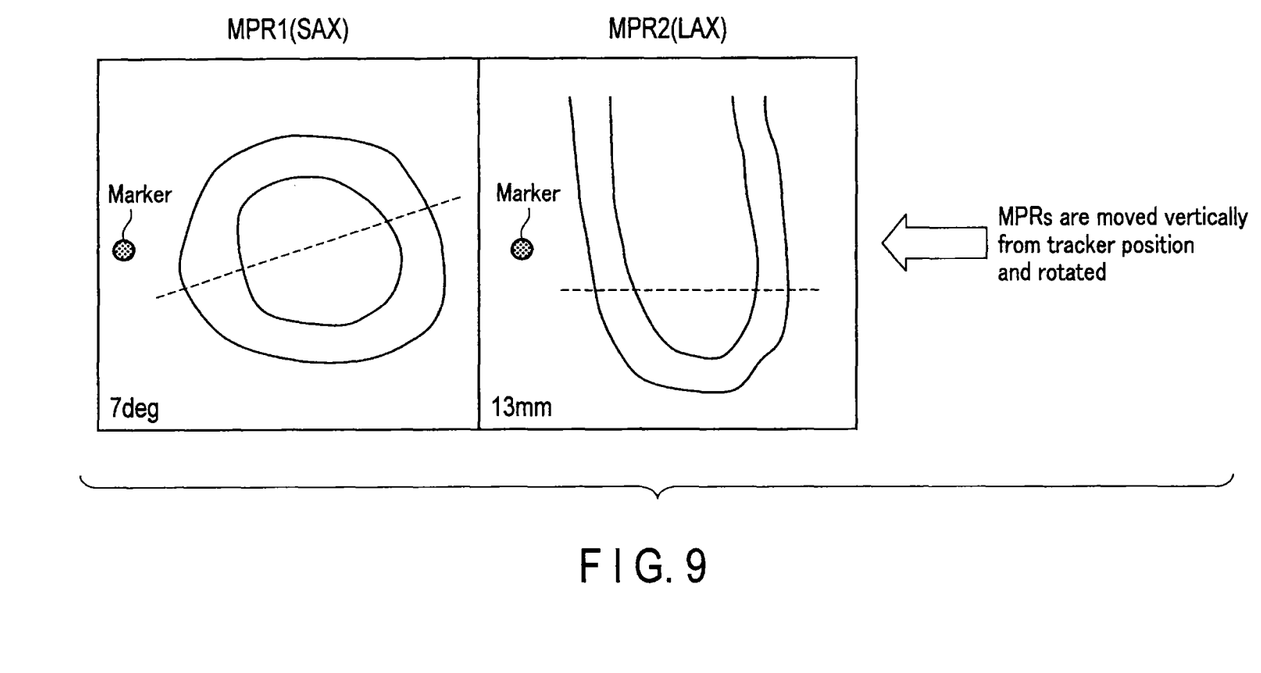
FIG. 9 is a view showing an example of displaying an MPR image including the long axis of the cardiac left ventricle and an MPR image perpendicular to the long axis of the cardiac left ventricle when an MPR image perpendicular to the long axis of the cardiac left ventricle is translated in the direction of the long axis of the left ventricle or an MPR image including the long axis of the cardiac left ventricle is rotated about the long axis of the left ventricle as a rotation axis according to the second embodiment.

Assume that in this state, the user has operated the mouse or keyboard (not shown) to translate MPR1 described above in the direction of the long axis of the left ventricle, as shown in FIG. 6. In this case, the medical image processing apparatus 200 displays, on the monitor 216, the slice (MPR1 (short axis slice)) perpendicular to the long axis of the cardiac left ventricle, in synchronism with the movement of MPR1, as indicated by the left part of FIG. 9. On the other hand, as shown in FIG. 7, assume that the user has operated the mouse or keyboard (not shown) to rotate MPR 2 described above about the long axis of the left ventricle as a rotation axis. The medical image processing apparatus 200 displays, on the monitor 216, the slice (MPR2 (long axis slice)) including the long axis of the cardiac left ventricle in synchronism with the rotation of MPR2, as indicated by the right part in FIG. 9.

As described above, according to the second embodiment, since a tracker which specifies a stenosis position on a coronary artery image can be moved without being moved along the running of the coronary artery, it is possible to arbitrarily observe a tomographic image near the tracker independently of the running of the coronary artery.

(Third Embodiment)

Figure 10:
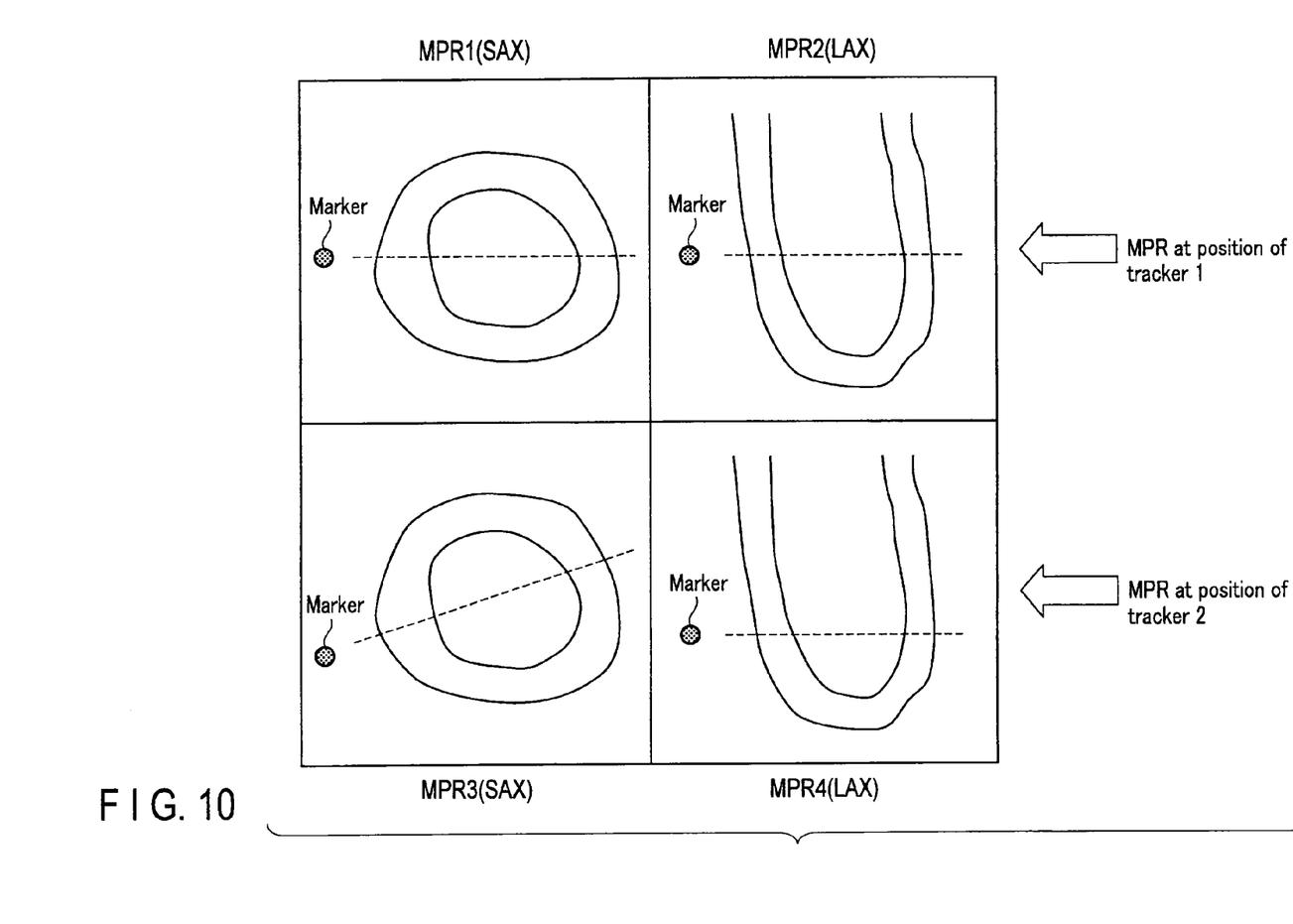
FIG. 10 is a view showing an example of displaying an MPR image including the long axis of the cardiac left ventricle and an MPR image perpendicular to the long axis of the cardiac left ventricle according to the third embodiment.

According to the third embodiment, a plurality of trackers are provided. In this case, as shown in FIG. 10, MPR images respectively corresponding to a plurality of trackers (two trackers in FIG. 10) are simultaneously displayed on a monitor 216.

A medical image processing apparatus 200 according to the third embodiment extracts a coronary artery portion from a CT image, and extracts a cardiac left ventricle portion from the CT image.

Subsequently, the medical image processing apparatus 200 pastes SPECT data on the cardiac left ventricle surface extracted from the CT image, extracts a long axis portion from the cardiac left ventricle portion extracted from the CT image, and calculates a stenosis ratio with respect to the coronary artery portion extracted from the CT image. A plurality of trackers are then set by specifying a stenosis position on the coronary artery image from the stenosis ratio calculation result. Such a tracker may be set for each centerline of the coronary artery.

The medical image processing apparatus 200 then obtains a slice (MPR1 (short axis slice)) passing through tracker 1 at the specified stenosis position and perpendicular to the long axis of the cardiac left ventricle and a slice (MPR2 (long axis slice)) including the long axis. At the same time, the medical image processing apparatus 200 obtains a slice (MPR3 (short axis slice)) passing through tracker 2 and perpendicular to the long axis of the cardiac left ventricle and a slice (MPR4 (long axis slice)) including the long axis.

As shown FIG. 10, the medical image processing apparatus 200 simultaneously displays, on the monitor 216, the obtained slices (MPR1 (short axis slice) MPR3 (short axis slice)) perpendicular to the long axis of the cardiac left ventricle and the obtained slices (MPR2 (long axis slice) and MPR4 (long axis slice)) including the long axis, and displays a marker (the bullet in FIG. 10) at a position corresponding to the stenosis position on each slice. Therefore, this display enables the user to observe the slices (MPR1 (short axis slice) and MPR3 (short axis slice)) perpendicular to the long axis of the cardiac left ventricle along, for example, the two coronary arteries, and the slices (MPR2 (long axis slice) and MPR4 (long axis slice)) including the long axis.

Assume that the user has operated the mouse or keyboard (not shown) so as to move tracker 1 on the coronary artery branch. In this case, the medical image processing apparatus 200 simultaneously displays, on the monitor 216, the slice (MPR1 (short axis slice)) perpendicular to the long axis of the cardiac left ventricle and the slice (MPR2 (long axis slice)) including the long axis in synchronism with the movement of tracker 1. Assume also that the user has operated the mouse or keyboard (not shown) to move tracker 2 described above on the coronary artery branch. The medical image processing apparatus 200 simultaneously displays, on the monitor 216, the slice (MPR3 (long axis slice)) perpendicular to the long axis of the cardiac left ventricle and the slice (MPR4 (long axis slice)) including the long axis in synchronism with the movement of tracker 2.

As described above, according to the third embodiment, since MPR images respectively corresponding to a plurality of trackers can be simultaneously displayed on the monitor 216, it is possible to simultaneously observe tomographic images of the respective specific regions on the coronary artery.

(Fourth Embodiment)

The fourth embodiment is an embodiment in which a functional image is a multiframe image (e.g., ultrasonic strain data).

Figure 11:
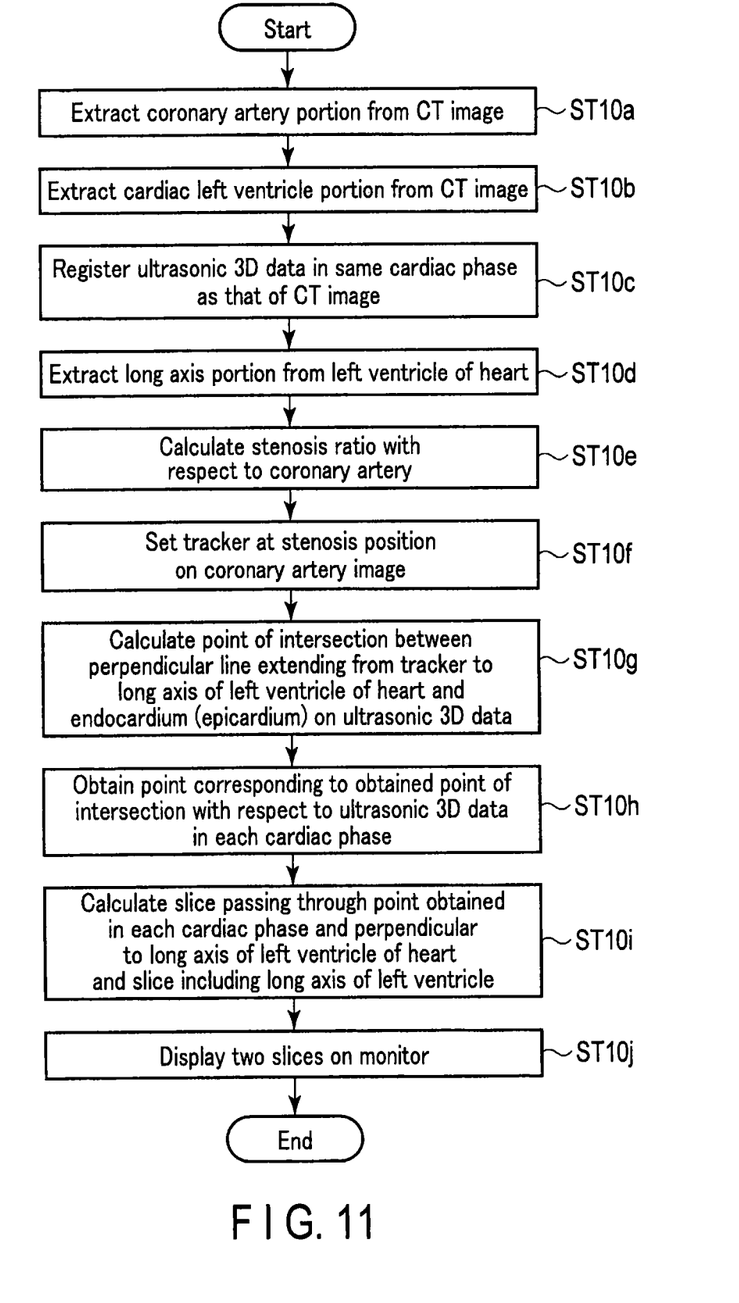
FIG. 11 is a flowchart showing a processing procedure in a medical image processing apparatus according to the fourth embodiment.

FIG. 11 is a flowchart showing a processing procedure in a medical image processing apparatus 200 according to the fourth embodiment.

First of all, the medical image processing apparatus 200 extracts a coronary artery portion from a CT image (step ST10a), and extracts a cardiac left ventricle portion from the CT image (step ST10b).

Subsequently, the medical image processing apparatus 200 registers ultrasonic 3D data (ultrasonic strain data) in the same cardiac phase as that of the CT image (step ST10c), extracts a long axis portion from the cardiac left ventricle portion extracted from the CT image (step ST10d), and calculates a stenosis ratio with respect to the coronary artery portion extracted from the CT image (step ST10e). A tracker is then set by specifying a stenosis position on the coronary artery image from this stenosis ratio calculation result (step ST10f).

Figure 12:
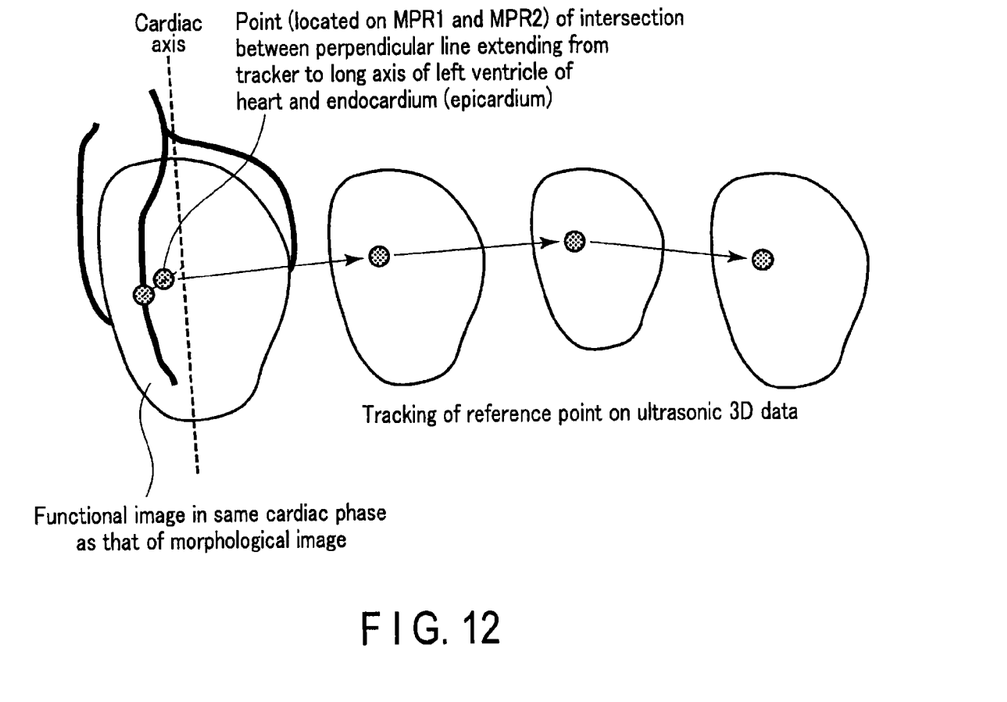
FIG. 12 is a view showing how to obtain a point of intersection between a perpendicular line extending from a tracker to the long axis of the cardiac left ventricle and the endocardium (epicardium) on ultrasonic 3D data in each cardiac phase according to the fourth embodiment.

The medical image processing apparatus 200 obtains a point of intersection (to be referred to as an intersection point) between a perpendicular line extending from a tracker to the long axis of the cardiac left ventricle and the endocardium (epicardium) on ultrasonic 3D data (step ST10g), and obtains a point corresponding to the intersection point in each cardiac phase, as shown in FIG. 12 (step ST10h). In this case, it is possible to obtain a point corresponding to the above intersection point by performing registration between ultrasonic 3D data in a plurality of cardiac phases.

The medical image processing apparatus 200 then obtains a slice (MPR1 (short axis slice)) passing through the point obtained in step ST10h in each cardiac phase and perpendicular to the long axis of the cardiac left ventricle and a slice (MPR2 (long axis slice)) including the long axis (step ST10i), and simultaneously displays, on a monitor 216, the obtained slice (MPR1 (short axis slice)) perpendicular to the long axis of the cardiac left ventricle and the obtained slice (MPR2 (long axis slice)) including the long axis (step ST10j). Therefore, this display enables the user to observe the time-series information of the slice (MPR1 (short axis slice)) perpendicular to the long axis of the cardiac left ventricle on the ultrasonic 3D data in each cardia phase and the slice (MPR2 (long axis slice)) including the long axis.

As described above, according to the fourth embodiment, it is possible to observe, for example, an MPR image on the coronary artery which corresponds to the movement of the heart from the time-series information of ultrasonic 3D data.

(Other Embodiments)

Each embodiment described above has exemplified the volume data of the coronary artery obtained from CT image data as a morphological image, and SPECT data or ultrasonic strain data as a functional image. However, each embodiment can be applied to other types of morphological images and functional images in the same manner as described above.

In addition, not only MPR image, but also thickened image (for example, slab) may be used for the tomographic image of the respective specific region on the coronary artery. In this case, the thickened image can be visualized by using a method of maximum intensity projection (MIP), average intensity projection, or the like.

Although several embodiments have been described above, they are merely examples and not intended to limit the scope of the present invention. These novel embodiments can be implemented in other various forms, and various omissions, replacements, and changes can be made without departing from the spirit of the present invention. These embodiments and their modifications are incorporated in the scope and sprit of the present invention, and are also incorporated in the scope of the invention and its equivalents defined in the appended claims.

The invention claimed is:

1. A medical image processing apparatus comprising:
processing circuitry configured to:
  acquire volume data of a morphological image and volume data of a functional image which are obtained by imaging an object;
  analyze the volume data of the morphological image;
  move a reference point on the volume data of the morphological image; and
  control to display a reference point on volume data of the morphological image and to decide a slice of the volume data of the functional image which passes through the reference point, based on an analysis result obtained by the processing circuitry, and change the slice of the volume data of the functional image in accordance with movement of the reference point by the processing circuitry.

2. The apparatus of claim 1, wherein the processing circuitry rotates a tomographic image including a reference axis of the volume data of the functional image about the reference axis as a rotation axis, thereby displaying the tomographic image near the reference point.

3. The apparatus of claim 1, wherein the processing circuitry translates a tomographic image perpendicular to a reference axis in the volume data of the functional image along the reference axis, thereby displaying the tomographic image near the reference point.

4. The apparatus of claim 1, wherein the processing circuitry moves a plurality of reference points along the volume data of the morphological image, and
  changes slices respectively corresponding to the plurality of reference points in accordance with movement of the plurality of reference points by the processing circuitry.

5. The apparatus of claim 1, when the volume data of the functional image includes a plurality of volumes along a time axis, wherein the processing circuitry decides the slice from a volume in the same cardiac phase as that of volume data of the morphological image among the plurality of volumes, and decides the tomographic image of a volume in another cardiac phase by performing registration between volumes in a plurality of cardiac phases.

6. A medical image processing method comprising:
acquiring volume data of a morphological image and volume data of a functional image which are obtained by imaging an object;
analyzing the volume data of the morphological image;
moving a reference point on the volume data of the morphological image; and
displaying a reference point on volume data of the morphological image and deciding a slice of the volume data of the functional image which passes through the reference point, based on an analysis result, and changing the slice of the volume data of the functional image in accordance with movement of the reference point.

7. The method of claim 6, wherein the deciding comprises rotating a tomographic image including a reference axis of the volume data of the functional image about the reference axis as a rotation axis, thereby displaying the tomographic image near the reference point.

8. The method of claim 6, wherein the deciding comprises translating a tomographic image perpendicular to a reference axis in the volume data of the functional image along the reference axis, thereby displaying the tomographic image near the reference point.

9. The method of claim 6, wherein moving comprises moving a plurality of reference points along the volume data of the morphological image, and
  the deciding comprises changing slices respectively corresponding to the plurality of reference points in accordance with movement of the plurality of reference points.

10. The method of claim 6, when the volume data of the functional image includes a plurality of volumes along a time axis,
  wherein the deciding comprises deciding the slice from a volume in the same cardiac phase as that of volume data of the morphological image among the plurality of volumes, and deciding the tomographic image of a volume in another cardiac phase by performing registration between volumes in a plurality of cardiac phases.

* * * * *